US005548498A

United States Patent [19]

Murakami

[11] Patent Number: 5,548,498

[45] Date of Patent: Aug. 20, 1996

[54] VEHICULAR LAMP HAVING APPEARANCE OF DEPTH

[75] Inventor: Tomokazu Murakami, Shizuoka, Japan

[73] Assignee: Koito Manufacturing Co., Ltd., Tokyo, Japan

[21] Appl. No.: 359,999

[22] Filed: Dec. 20, 1994

[30] Foreign Application Priority Data

Dec. 20, 1993 [JP] Japan .............................. 5-072836 U

[51] Int. Cl.[6] .............................................. B60Q 1/00

[52] U.S. Cl. .......................... 362/336; 362/309; 362/329; 362/338

[58] Field of Search ............................ 362/61, 308, 309, 362/311, 326, 328, 329, 331, 332, 336, 338; 359/619, 625, 626, 725

[56] References Cited

U.S. PATENT DOCUMENTS 1,726,460 8/1929 Upp ........................................ 362/336

4,680,678 7/1987 Iwaki .................................... 362/332

FOREIGN PATENT DOCUMENTS 222201 10/1991 Japan .................................... 362/308

1301659 1/1973 United Kingdom .................. 362/336

*Primary Examiner*—Denise L. Gromada

*Assistant Examiner*—Y. Quach

*Attorney, Agent, or Firm*—Sughrue, Mion, Zinn, Macpeak & Seas

[57] ABSTRACT

A lamp for vehicles including a lamp body having a front opening, a reflector disposed at an inner-rear surface of the lamp body, a light source mounted at the central part of the lamp body for emitting a light beam, and an outer lens covering the front opening of the lamp body. The outer lens includes fisheye steps and cylindrical steps, and the fisheye steps and the cylindrical steps are alternatingly arrayed.

13 Claims, 3 Drawing Sheets

VEHICULAR LAMP HAVING APPEARANCE OF DEPTH

BACKGROUND OF THE INVENTION

The present invention relates to a vehicular lamp, more particularly, the invention provides a vehicular lamp having a novel outer lens which makes the lamp have an appearance of depth.

In the outer lens of a conventional vehicular lamp fisheye steps are formed over the entire surface of the lens so as to conceal the interior of the lamp, or cylindrical steps are formed over the entire surface of the lens, so that the interior of the lamp is seen from the outside. The conventional lamp thus looks flat as a whole due to the presence of the fisheye steps or cylindrical steps.

SUMMARY OF THE INVENTION

The present invention was made in order to overcome such disadvantages accompanying the conventional lamp.

Accordingly, an object of the invention is to provide a vehicular lamp capable of presenting a deep appearance and thus providing a good visual impression.

The above and other objects can be achieved by a provision of a vehicular lamp which, according to the present invention, includes an outer lens for covering a front opening of a lamp body having a light source disposed therein, thereby defining a lamp space, and the outer lens is provided with fisheye steps and cylindrical steps that are alternatingly arrayed.

In the lamp thus constructed, the area of the outer lens where the fisheye steps are formed allows one to see the outer lens per se, while the area of the outer lens where the cylindrical steps are formed allows one to see the interior of the lamp space. Different distances to the objects that are seen, viz., the outer lens and the interior of the lamp body, causes the lamp to have an appearance of depth.

DESCRIPTION OF THE PREFERRED EMBODIMENTS

A preferred embodiment of a vehicular lamp according to the present invention will be described with reference to the accompanying drawings. An outer lens according to the embodiment described hereinbelow is applied, as one example, to a marker lamp for motor vehicles.

Figure 1:
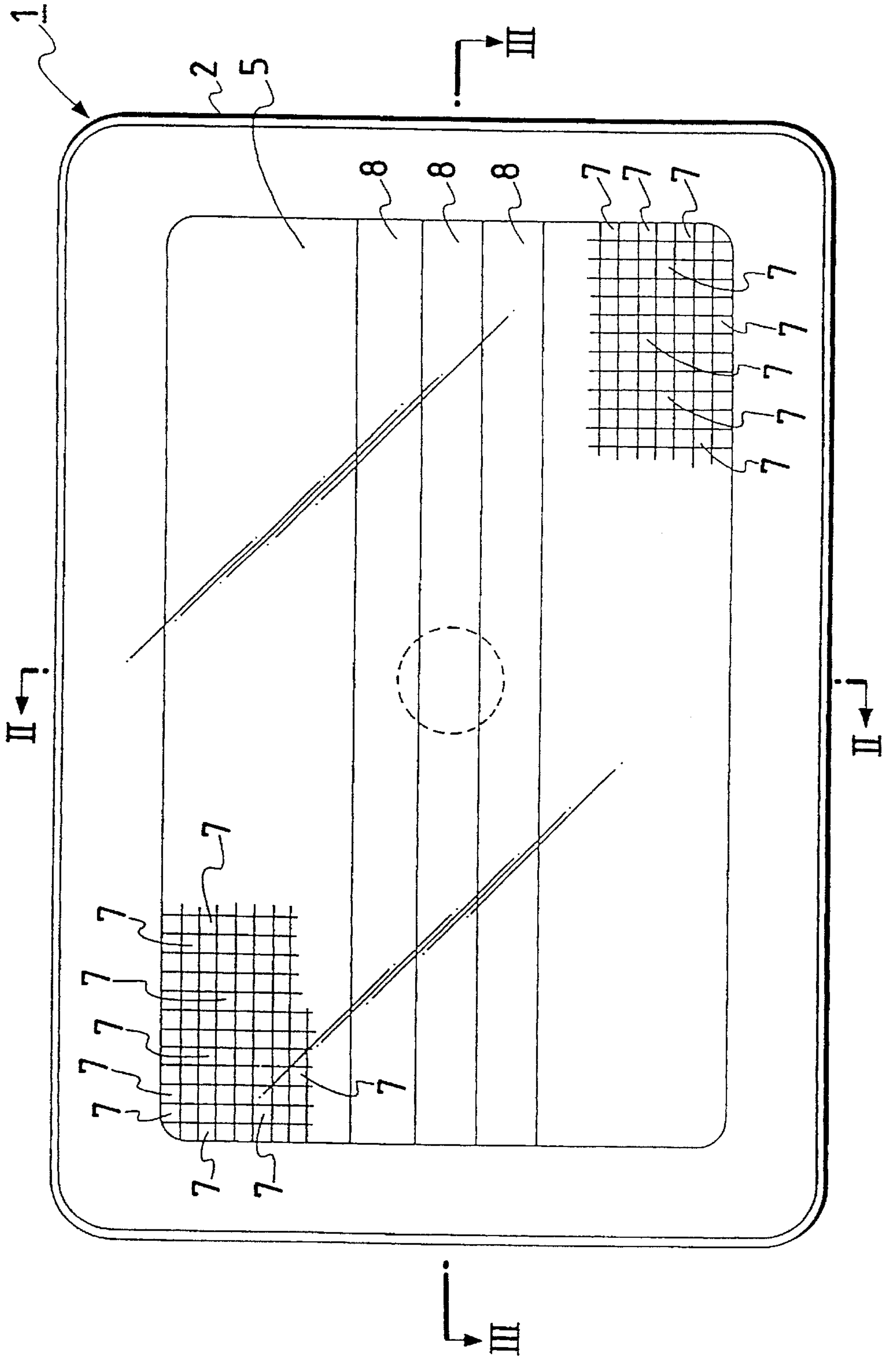
FIG. 1 is a front view showing an embodiment of an identification lamp for vehicles constructed according to the present invention.
Figure 2:
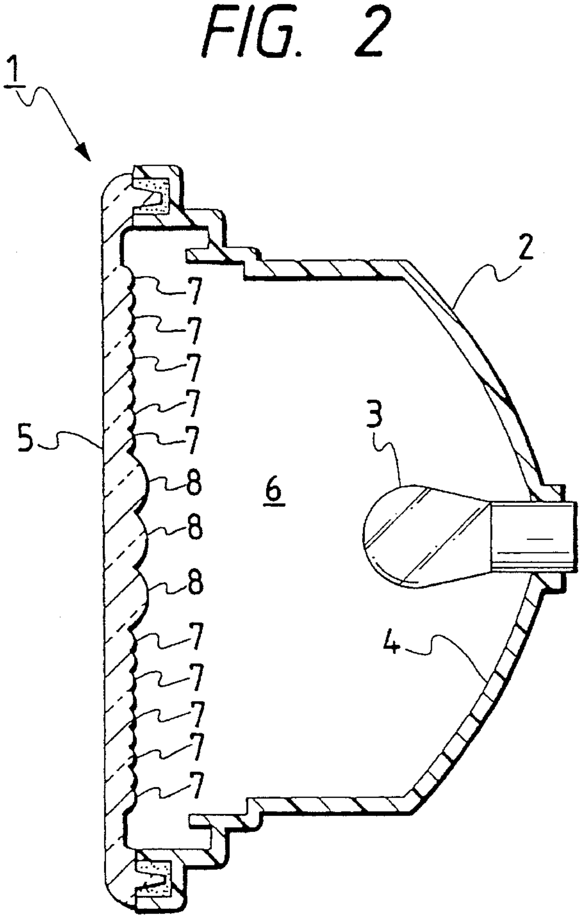
FIG. 2 is a cross-sectional view taken on a line II—II in FIG. 1.
Figure 3:
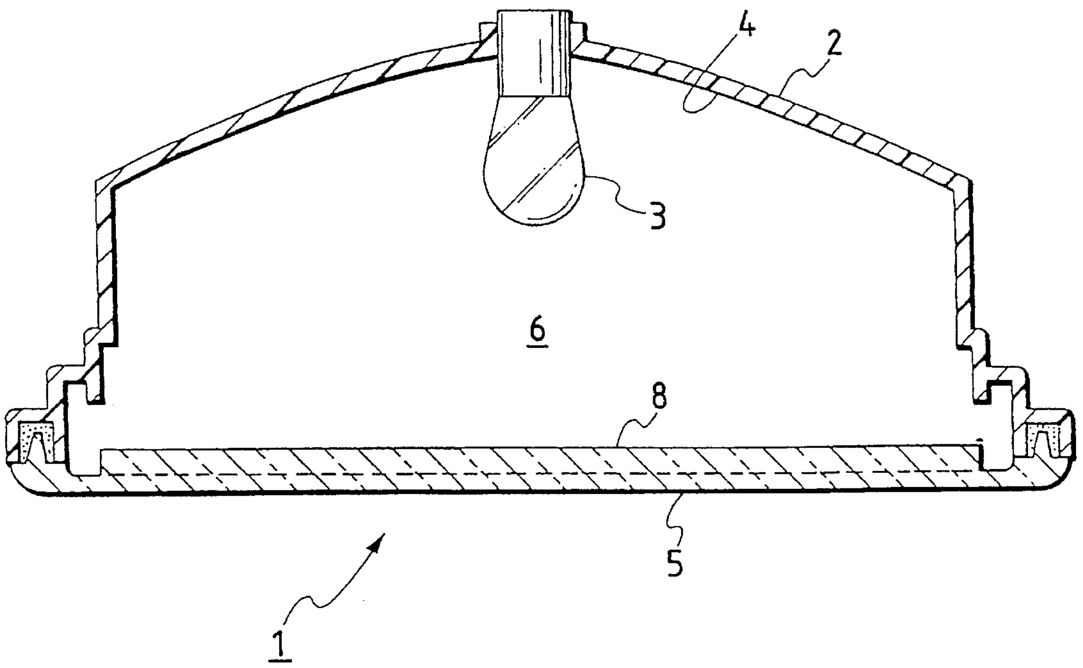
FIG. 3 is a cross-sectional view taken on a line III—III in FIG. 1.

FIG. 1 is a front view showing a preferred embodiment of an identification lamp for vehicles according to the present invention, FIG. 2 is a cross-sectional view taken on a line II—II in FIG. 1, and FIG. 3 is a cross-sectional view taken on a line III—III in FIG. 1.

The signal lamp 1 of the invention includes a lamp body 2 and a bulb 3 mounted at the central part of the lamp body 2. The inner surface 4 of the rear part of the lamp body 2 is coated with a reflecting material to serve as a reflection surface.

An outer lens 5 is attached to the lamp body 2 such that the front opening of the lamp is covered with the outer lens 5. The outer lens is formed of a transparent synthetic resin. A lamp space 6 is defined by the lamp body 2 and the outer lens 5. The outer lens 5 is vertically segmented into three sectional areas. Fisheye steps 7, which curve upward, are formed on the rear surface of the top and bottom sectional areas. Horizontal cylindrical steps 8, which also curve upward, are formed on the rear surface of the middle sectional area of the outer lens. The fisheye steps 7 are arrayed at relatively short pitches, while the cylindrical steps 8 are arrayed at relatively large pitches.

In the marker lamp 1 thus constructed, when viewing the lamp from the front side, one can see just the outer lens 5 in the top and bottom sectional areas where the fisheye steps 7 are formed. In the middle sectional area where the cylindrical steps 8 are formed, one can see the interior of the lamp space 6 through this area of the outer lens. The difference of the distances to the objects (fisheye steps and the interior of the lampspace) seen from the front side provides the lamp with an appearance of depth.

As described above, in the marker lamp for vehicles, the front opening of a lamp space with a light source disposed therein is covered with an outer lens, and the lens includes fisheye steps and cylindrical steps that are alternatingly arrayed.

With the marker lamp thus constructed, the area of the outer lens where the fisheye steps are formed allows one to see just the lens, while the area of the outer lens where the cylindrical steps are formed allows one to see the interior of the lamp space. The resulting different distances to the objects gives the lamp an appearance of depth.

In the above-mentioned embodiment, the area in which the fisheye steps are formed and the area in which the cylindrical steps are formed are alternatingly arrayed in the vertical direction. If desired, these areas may be alternatingly arrayed in the horizontal direction. A larger number of such areas can of course be used if desired.

Figure 4A:
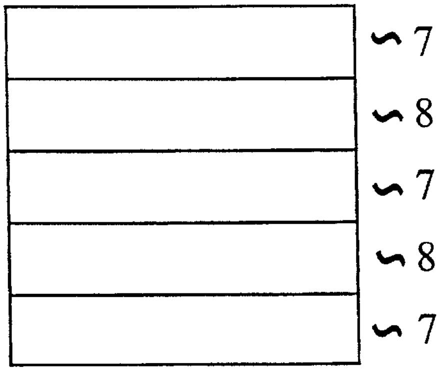
FIGS. 4A–4D are schematic illustrations of alternative embodiments of the structure shown in FIG. 1.

FIG. 4A is a schematic illustration of an alternative embodiment to FIG. 1, where the outer lens is vertically segmented into a plurality of sectional areas, and the sectional areas are alternatingly formed of fisheye steps and cylindrical steps.

Figure 4B:
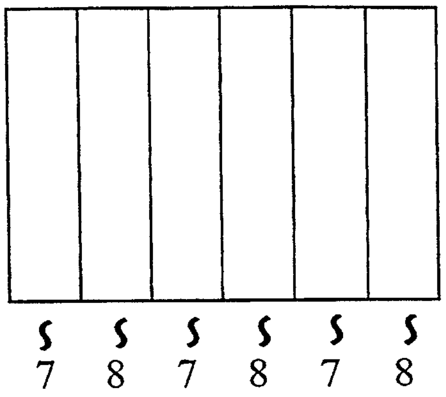

FIG. 4B is a schematic illustration of an alternative embodiment to FIG. 1, where the outer lens is horizontally segmented into a plurality of sectional areas, each of the sectional areas being alternatingly formed of fisheye steps and cylindrical steps.

Figure 4C:
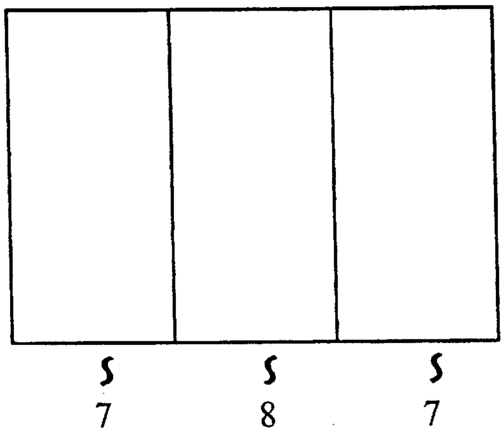

FIG. 4C is a schematic illustration of an alternative embodiment to FIG. 1, where the outer lens is horizontally segmented into three sectional areas, of which left and right areas of the outer lens are formed of fisheye steps and a middle area of the outer lens is formed of cylindrical steps.

Figure 4D:
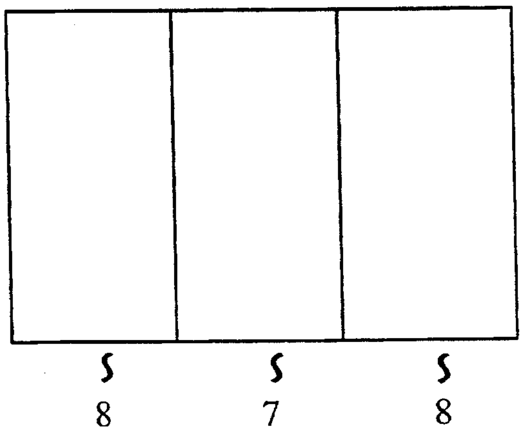

FIG. 4D is a schematic illustration of an alternative embodiment to FIG. 1, where the outer lens is horizontally segmented into three sectional areas, each of which right and left areas of the outer lens are formed of cylindrical steps and a middle area of the out lens is formed of fisheye steps.

It should be understood that the form of the invention herein shown and described is to be taken as a preferred example of the invention and that various changes in the shape, size and arrangement of parts may be resorted to without departing from the spirit of the invention or the scope of the subjoined claims. For example, the outer lens of the invention is also applicable to a turn signal lamp, a stop lamp or a rear lamp of an automobile, not only a marker lamp.

What is claimed is:

1. A vehicular lamp comprising:

a lamp body having a front opening and a central part;

a reflector disposed at an inner-rear surface of said lamp body;

a light source mounted at the central part of said lamp body for emitting a light beam; and an outer lens covering said front opening of said lamp body, said outer lens comprising fisheye steps and cylindrical steps, said fisheye steps and said cylindrical steps being alternatingly arrayed.

2. The lamp according to claim 1, wherein said outer lens is vertically segmented into a plurality of sectional areas, and said sectional areas being alternatingly formed of said fisheye steps and said cylindrical steps.

3. The lamp according to claim 2, wherein said outer lens is vertically segmented into three sectional areas, and top and bottom areas thereof are formed of said fisheye steps and a middle area of the outer lens is formed of said cylindrical steps.

4. The lamp according to claim 2, wherein said outer lens is vertically segmented into three sectional areas, and top and bottom areas thereof are formed of said cylindrical steps and a middle area of the outer lens is formed of said fisheye steps.

5. The lamp according to claim 1, wherein said outer lens is horizontally segmented into a plurality of sectional areas, each of said sectional areas being formed of one of said fisheye steps and said cylindrical steps said fisheye steps sectional areas and said cylindrical steps sectional areas being alternatingly disposed.

6. The lamp according to claim 5, wherein said outer lens is horizontally segmented into three sectional areas, of which left and right areas of the outer lens are formed of said fisheye steps and a middle area of the outer lens is formed of said cylindrical steps.

7. The lamp according to claim 5, wherein said outer lens is horizontally segmented into three sectional areas, of which right and left areas of the outer lens are formed of said cylindrical steps and a middle area of the outer lens is formed of said fisheye steps.

8. The lamp according to claim 1, wherein said fisheye steps are arrayed at relatively short pitches, and said cylindrical steps are arrayed at relatively large pitches.

9. The lamp according to claim 1, wherein said outer lens is formed of a transparent synthetic resin.

10. The lamp according to claim 1, wherein the lamp is a marker lamp.

11. The lamp according to claim 1, wherein the lamp is a turn signal lamp.

12. The lamp according to claim 1, wherein the lamp is a stop lamp.

13. The lamp according to claim 1, wherein the lamp is a rear lamp.

* * * * *